United States Patent [19]

Kuhr et al.

[11] Patent Number: 5,154,783
[45] Date of Patent: Oct. 13, 1992

[54] TREAD FOR A PNEUMATIC VEHICLE TIRE

[75] Inventors: Wolfgang Kuhr; Norbert Zinnen, both of Aachen, Fed. Rep. of Germany

[73] Assignee: Uniroyal Englebert Reifen GmbH, Aachen, Fed. Rep. of Germany

[21] Appl. No.: 639,569

[22] Filed: Jan. 10, 1991

[30] Foreign Application Priority Data

Jan. 10, 1990 [DE] Fed. Rep. of Germany ....... 9000204

[51] Int. Cl.$^5$ .............................................. B60C 11/04
[52] U.S. Cl. .............................. 152/209 R; 152/209 B; D12/149
[58] Field of Search ........... 152/209 R, 209 B, 209 D; D12/146, 147, 149, 151

[56] References Cited

U.S. PATENT DOCUMENTS

| D. 170,710 | 10/1953 | Nellen ............................ 152/209 D |
| 3,603,370 | 9/1971 | Hylbert et al. ................... 152/209 B |
| 4,222,424 | 9/1980 | Tsuzura et al. .................. 152/209 B |
| 4,687,037 | 8/1987 | Pfeiffer et al. ................... 152/209 R |

FOREIGN PATENT DOCUMENTS 0291204 12/1986 Japan ............................ 152/209 R

OTHER PUBLICATIONS

"Der Reifen, der nicht baden geht"; Auto Bild; Oct. 22, 1990.
"Die ganz andere Problemlösung"; Produckte, Oct. 1990, pp. 94-98.

Primary Examiner—Michael W. Ball
Assistant Examiner—Nancy T. Krawczyk
Attorney, Agent, or Firm—Robert W. Becker & Associates

[57] ABSTRACT

A tread design for a pneumatic tire of radial construction for high-speed vehicles is provided. The tire has a tread design that comprises profiled elements that each comprise, starting from a centrally disposed circumferential groove, in succession, a first part that is disposed adjacent to the central groove and extends parallel to the equatorial planes of the tire, aa longer, elongated central portion that extends at an angle of 5° to 30° to the equatorial plane and ends in a bend region, and a fork-shaped end portion that is disposed in a shoulder region of the tire and extends at an angle of 60° to 90°, with each two adjacent profiled elements on either side of the central groove being interconnected by a bridge element that is disposed in a base of an inclined groove provided between the profiled elements and projects beyond the base thereof, and with the profiled elements on one side of the central groove being staggered in a circumferential direction relative to the profiled elements on the other side of the central groove.

5 Claims, 1 Drawing Sheet

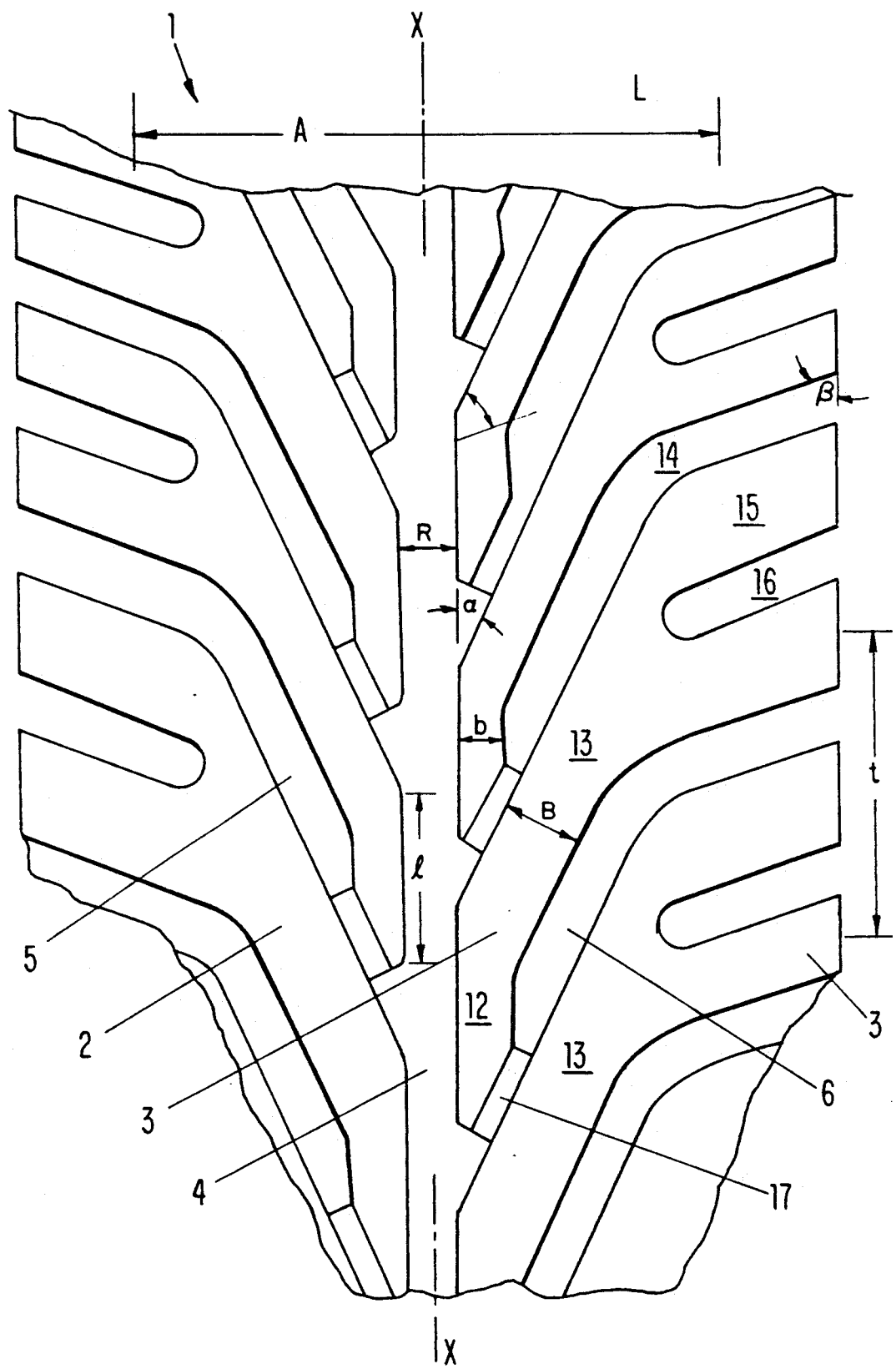

TREAD FOR A PNEUMATIC VEHICLE TIRE

BACKGROUND OF THE INVENTION

The present invention relates to a tread design for a pneumatic tire of radial construction for high-speed vehicles, with the tire having a height-to-width ratio of $\leq 0.6$. These vehicle tires have a belt-reinforced tread portion with a tread design that is tied to the direction of rotation and comprises profiled elements that are disposed in the circumferential direction at a steep angle to the equatorial plane of the tire and are arranged in the shape of V's. The profiled elements extend from a common, centrally disposed circumferential groove into shoulder regions of the tire, with the profiled elements being angled-off at a bend region in a direction that is substantially parallel to the axis of the tire. Steeply oriented inclined grooves that are angled-off in the shoulder regions and that end in the circumferential groove are formed between the profiled elements.

A tread design of this general type is known from U.S. Pat. 4,687,037, Hans-Dieter Pfeiffer et al, where the profiled elements are disposed in the shape of V's, and where a wide central groove is provided between the profiled elements. With wide tires of the aforementioned height-to-width ratio, an effective drainage and a high resistance to aquaplaning should also be ensured at high speeds. Furthermore, to provide favorable low wear in the central and shoulder regions, the tread design should have a favorable positive tread portion that additionally ensures that the tire noise can be maintained at a tolerably low level.

With regard to the discharge configuration of the inclined grooves, and the configuration of the starting region of the profiled element ribs, the heretofore known tread design is susceptible of being improved in order to provide more favorable inflow and discharge conditions in the inclined grooves and to increase the stability of the profiled elements in the central portion of the tread, all without adversely affecting the effective drainage of the tread design.

It is therefore an object of the present invention to provide a tread design of the aforementioned general type where the profiled elements are oriented in the circumferential direction in the vicinity of the central circumferential groove, whereby only as they extend further are these profiled elements disposed at an angle to the equatorial plane of the tire, whereby at the bend region the profiled elements are angled-off in a direction that is substantially parallel to the axis of the tire.

BRIEF DESCRIPTION OF THE DRAWING

This object, and other objects and advantages of the present invention, will appear more clearly from the following specification in conjunction with the accompanying schematic drawing, which illustrates one exemplary embodiment of the inventive tread design.

SUMMARY OF THE INVENTION

The tread design of the present invention is characterized primarily in that the profiled elements comprise an elongated central portion that is inclined at an angle relative to the equatorial plane of the tire, furthermore an initial or first part that in the central portion of the tire is oriented parallel to the equatorial plane, and furthermore an end portion that is fork-shaped in the shoulder region and is oriented essentially parallel to the axis of the tire.

The first part of each profiled element has a specific yet selectable length that is disposed in the circumferential direction of the tire and is respectively connected, via a profiled bridge element having approximately half the height of the profiled element, to the central portion of the adjacent profiled element. The elongated central portion of the profiled element is disposed at an angle of from 5 to 30° relative to the equatorial plane of the tire, and after a bend region changes into a fork-shaped end portion that is disposed essentially transverse to the equatorial plane, and in particular extends at an angle of from 60 to 90°. The profiled elements, which are disposed in both halves of the tread surface, are arranged in the shape of V's relative to one another and are also staggered in the circumferential direction relative to one another, for example by a distance that is approximately equal to the length of the first part of the profiled elements. The central portion of the tread design is formed by the continuous circumferential groove, into which all of the inclined grooves open.

The inventive design provides a wide tire tread that is resistant to wear in the central and shoulder regions, which in addition develops relatively little noise, and which furthermore provides an effective drainage system. This is achieved because the inclined grooves, which communicate with the centrally disposed circumferential groove, proceed at a steep inclined angle from the central groove and extend continuously into the angled-off shoulder portion. This ensures a very effective removal of water.

The width of the central portion of each profiled element is preferably approximately 1.5 times wider than the width of the narrower initial or first part of each profiled element, and the central circumferential groove has a width that is preferably 0.6 to 1.2 times the width of the central portion of the profiled element. With the inventive circumferential orientation of the first part of each profiled element, the inclined groove, adjacent the bridge element, is wider than the narrow flow-through region at the bridge element connection. Nevertheless, a linear flow direction out of the central groove through the narrow bridge element region, through the wider inclined groove, and to the open shoulder region is ensured.

Since the main direction of flow for water that is received is in the circumferential direction and in the very steeply oriented inclined directions, great drainage is ensured not only at high speeds but also where flow-through is partially interrupted during braking.

Further specific features of the present invention will be described in detail subsequently.

DESCRIPTION OF PREFERRED EMBODIMENTS

Referring now to the drawing in detail, the tread configuration or design 1 is formed from shaped or profiled elements 2 and 3, a number of which are provided in each half of the tread surface, with these profiled elements being arranged in such a way relative to one another that they are essentially disposed in the shape of V's. The central portion of the tread design is formed by a linear, continuous, circumferential groove 4. When viewed in the circumferential direction of the tire, the profiled elements 2, 3 are offset relative to one another. Each of the profiled elements 2, 3 comprises an initial or first part 12 that extends parallel to the equatorial plane x—x and has a length "1"; and also comprises a central portion 13 that extends at an angle α to the equatorial plane x—x, with this angle being 5° to 30°, and in the illustrated embodiment being 15°; and furthermore comprises an end portion 15 that branches off at the bend region 14 and extends at an angle β of 70°, ending in the shoulder region. The width of the tire support is designated by the reference symbol A, and the direction of normal travel of the tire is designated by the reference symbol L.

The profiled elements 2, 3 are respectively interconnected by a bridge element 17 that is disposed between the first part 12 of one profiled element 2, 3 and the central portion 13 of the adjacent profiled element 2, 3. This ensures the stability of that portion of the profiled element that extends in the circumferential direction. On that side facing the central portion of the tire, the profiled elements 2, 3 form between their first parts 12 the central, continuous circumferential groove 4. Formed between the central and end portions of adjacent profiled elements 2, 3 are steeply oriented inclined grooves 5, 6 that have a high drainage capacity.

Such a largely circumferentially oriented tread design ensures not only a very effective drainage, but in addition at high speeds a premature aquaplaning of the tire can be avoided because adequate escape paths always remain open. Furthermore, the inventive tread design provides a relatively wear-resistant tread because the tread is well supported on the one hand in the middle and in the shoulder via bridge elements and on the other hand by the fanned-out arrangement of the ends of the profiled elements. With regard to the development of noise, such a tread design operates very quietly.

With regard to the configuration of the fork-shaped shoulder portion of the tread design, either one short auxiliary groove 16 can be provided, or it is also possible to provide two or more spaced-apart auxiliary grooves. The forked shoulder configuration can also be split up by individual additional short ribs that are disposed between the ends of the profiled elements.

In the illustrated embodiment, the width B of the central portion 13 of the profiled element 2, 3 is 15 mm, and the width "b" of the first part 12 of the profiled element is, for example, 10 mm. The central circumferential groove 4 has a width R of 10 to 20 mm. The element 17 that connects the profiled elements in the central portion of the tread is disposed in the base of the groove and has about half the height or about 4 mm, of the main portion of the profiled element, which is approximately 8 mm. The length "1" of the first part 12 is a function of the circumferential interval or division "t", of the angle α, and of the width B of the inclined central portion 13 of the profiled elements 2, 3. The inclined grooves 5, 6 are wider than the flow-through width in the region of the element 17.

The present invention is, of course, in no way restricted to the specific disclosure of the specification and drawings, but also encompasses any modifications within the scope of the appended claims.

What we claim is:

1. In a pneumatic tire of radial construction for high-speed vehicles, with said tire having a height-to-width ratio of ≦0.6, and furthermore having a belt-reinforced tread portion with a tread design that is tied to the direction of rotation and comprises profiled elements that are disposed at an angle to an equatorial plane of said tire and are arranged in the shape of V's, with said profiled elements extending from a centrally disposed circumferential groove into shoulder regions of said tire, with said profiled elements being angled-off at a bend region in the direction of an axis of said tire, and with steeply oriented, angled-off inclined grooves that end in said circumferential groove being formed between said profiled elements, the improvement wherein:

each of said profiled elements, starting from said circumferential groove, is unitary and comprises, in succession, a first part that is disposed adjacent said circumferential groove and extends parallel to said equatorial plane of said tire, an elongated central portion that extends at an angle of 5° to 30° to said equatorial plane and ends in said bend region, wherein said central portion has a width greater than said first part, with said widths being measured between parallel sides of the pertaining component, and a fork-shaped end portion that is disposed in one of said shoulder regions of said tire and extends at an angle of 60° to 90°, with each two adjacent ones of said profiled elements on either side of said circumferential groove being interconnected by a bridge element that extends at an angle substantially equivalent to the extending angle of said central portion, is disposed in a base of one of said inclined grooves, and projects beyond said base thereof, and with said profiled elements on one side of said circumferential groove being staggered in a circumferential direction relative to said profiled elements on the other side of said circumferential groove.

2. A tire according to claim 1, in which said central portion of a profiled element has said width that is approximately 1.5 times greater than said width of said first part thereof, and in which said circumferential groove has a width that is 0.6 to 1.2 times said width of said central portion.

3. A tire according to claim 1, in which each of said bridge elements extends from said first part of one of said profiled elements to said central portion of said adjacent profiled element.

4. A tire according to claim 1, in which at least a portion of each of said inclined grooves extends linearly all the way from said bend region to said circumferential groove.

5. A tire according to claim 4, in which said inclined groove is wider from said bridge element to said bend region than in the vicinity of said bridge element itself.

* * * * *